United States Patent
Muff et al.

(10) Patent No.: US 9,678,885 B2
(45) Date of Patent: Jun. 13, 2017

(54) REGULAR EXPRESSION MEMORY REGION WITH INTEGRATED REGULAR EXPRESSION ENGINE

(71) Applicant: GLOBALFOUNDRIES Inc., Grand Cayman (KY)

(72) Inventors: Adam J. Muff, Woodinville, WA (US); Paul E. Schardt, Rochester, MN (US); Robert A. Shearer, Woodinville, WA (US); Matthew R. Tubbs, Issaquah, WA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 947 days.

(21) Appl. No.: 13/948,487

(22) Filed: Jul. 23, 2013

(65) Prior Publication Data

US 2015/0032988 A1    Jan. 29, 2015

(51) Int. Cl.
G06F 12/02 (2006.01)
G06F 12/10 (2016.01)
H04L 29/08 (2006.01)
G06F 12/1009 (2016.01)

(52) U.S. Cl.
CPC .......... *G06F 12/10* (2013.01); *G06F 12/1009* (2013.01); *H04L 29/08801* (2013.01); *G06F 2212/1024* (2013.01)

(58) Field of Classification Search
CPC ............ G06F 12/10; G06F 12/1009; G06F 2212/1024; H04L 29/08801
See application file for complete search history.

(56) References Cited

U.S. PATENT DOCUMENTS

| 8,191,049 | B2 | 5/2012 | Levine et al. | |
|---|---|---|---|---|
| 2003/0005249 | A1* | 1/2003 | Wilson | G06F 12/10 711/165 |
| 2007/0124146 | A1* | 5/2007 | Lunteren | H04L 63/1408 704/255 |
| 2009/0307175 | A1* | 12/2009 | Francesco | G06F 9/444 706/48 |

(Continued)

OTHER PUBLICATIONS

U.S. Appl. No. 13/355,806 entitled, "Memory Address Translation-Based Data Encryption/Compression" filed by Adam J. Muff et al. on Jan. 23, 2012.

(Continued)

*Primary Examiner* — Arpan P. Savla
(74) *Attorney, Agent, or Firm* — Michael LeStrange; Andrew M. Caldeorn; Roberts Mlotkowski Safran Cole & Calderon, P.C.

(57) ABSTRACT

A method and circuit arrangement selectively perform regular expression matching in connection with accessing data with a processing unit based upon one or more regular expression matching-related attributes stored in a memory address translation data structure such as an Effective To Real Translation (ERAT) or Translation Lookaside Buffer (TLB). A regular expression matching-related attribute in such a data structure may be used to control whether data being communicated between the processing unit and a communications bus is routed through an expression engine integrated with the processing unit such that regular expression matching may be performed in association with the data communication.

19 Claims, 8 Drawing Sheets

(56) References Cited

U.S. PATENT DOCUMENTS

| | | | |
|---|---|---|---|
| 2012/0109913 A1* | 5/2012 | Rajure | H04L 45/54 707/694 |
| 2012/0204000 A1* | 8/2012 | Biran | G06F 17/30985 711/202 |
| 2012/0210068 A1* | 8/2012 | Joshi | G06F 9/45558 711/122 |
| 2012/0221711 A1 | 8/2012 | Kuesel et al. | |

OTHER PUBLICATIONS

U.S. Appl. No. 13/355,827 entitled, "Memory Address Translation-Based Data Encryption with Integrated Encryption Engine" filed by Adam J. Muff et al. on Jan. 23, 2012.

* cited by examiner

REGULAR EXPRESSION MEMORY REGION WITH INTEGRATED REGULAR EXPRESSION ENGINE

FIELD OF THE INVENTION

The invention is generally related to data processing, and in particular to processor architectures and regular expression matching.

BACKGROUND OF THE INVENTION

Regular expression matching is generally used to detect specific values in a set of data, e.g., to detect particular characters, words, or patterns of characters in a string of text. Regular expression matching is often used, for example, in edge of network workloads to detect specific values in data packets communicated over a network. Whereas software routines may be used to perform regular expression matching, for high volume and/or high speed applications such as network workloads, it is often desirable to perform regular expression matching in hardware to reduce the overhead of such operations.

In addition, as semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

As such, it is now possible to incorporate dedicated regular expression matching logic, often referred to as an expression engine, on a chip to accelerate regular expression matching operations. Typically, however, an expression engine is implemented as a coprocessor and is coupled to one or more general purpose processing cores via an on-chip network. The general purpose processing cores typically pass data to the expression engine to perform regular expression matching before loading and using the data. However, in such an arrangement, the expression engine becomes a shared resource, particularly for real-time software algorithms. Accordingly, the expression engine may become a bottleneck should multiple general purpose processing cores need to use the expression engine at the same time.

Therefore, a significant need continues to exist in the art for a manner of minimizing the performance overhead associated with regular expression matching in a data processing system.

SUMMARY OF THE INVENTION

The invention addresses these and other problems associated with the prior art by providing a method and circuit arrangement that selectively perform regular expression matching in connection with accessing data with a processing unit based upon one or more regular expression matching-related attributes stored in a memory address translation data structure such as an Effective To Real Translation (ERAT) or Translation Lookaside Buffer (TLB). A memory address translation data structure may be accessed, for example, in connection with a memory access request for data in a memory page, such that attributes associated with the memory page in the data structure may be used to control whether regular expression matching is performed in association with the data access, and if so, how such matching is to occur. Furthermore, an expression engine may be integrated into a processing unit, e.g., a processing core in a multi-core chip, such that regular expression matching may be performed in association with the transfer of data between the processing unit and a communications bus with reduced performance overhead as compared to expression engines implemented as coprocessors or other shared resources.

Therefore, consistent with one aspect of the invention, data is accessed in a data processing system by, in response to a memory access request initiated by a processing unit in the data processing system, accessing a memory address translation data structure to perform a memory address translation for the memory access request; accessing at least one regular expression matching-related attribute in the memory address translation data structure to determine whether regular expression matching should be performed on data from the memory page associated with the memory access request; and causing regular expression matching to be performed on data from the memory page based upon the at least one regular expression matching-related attribute.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
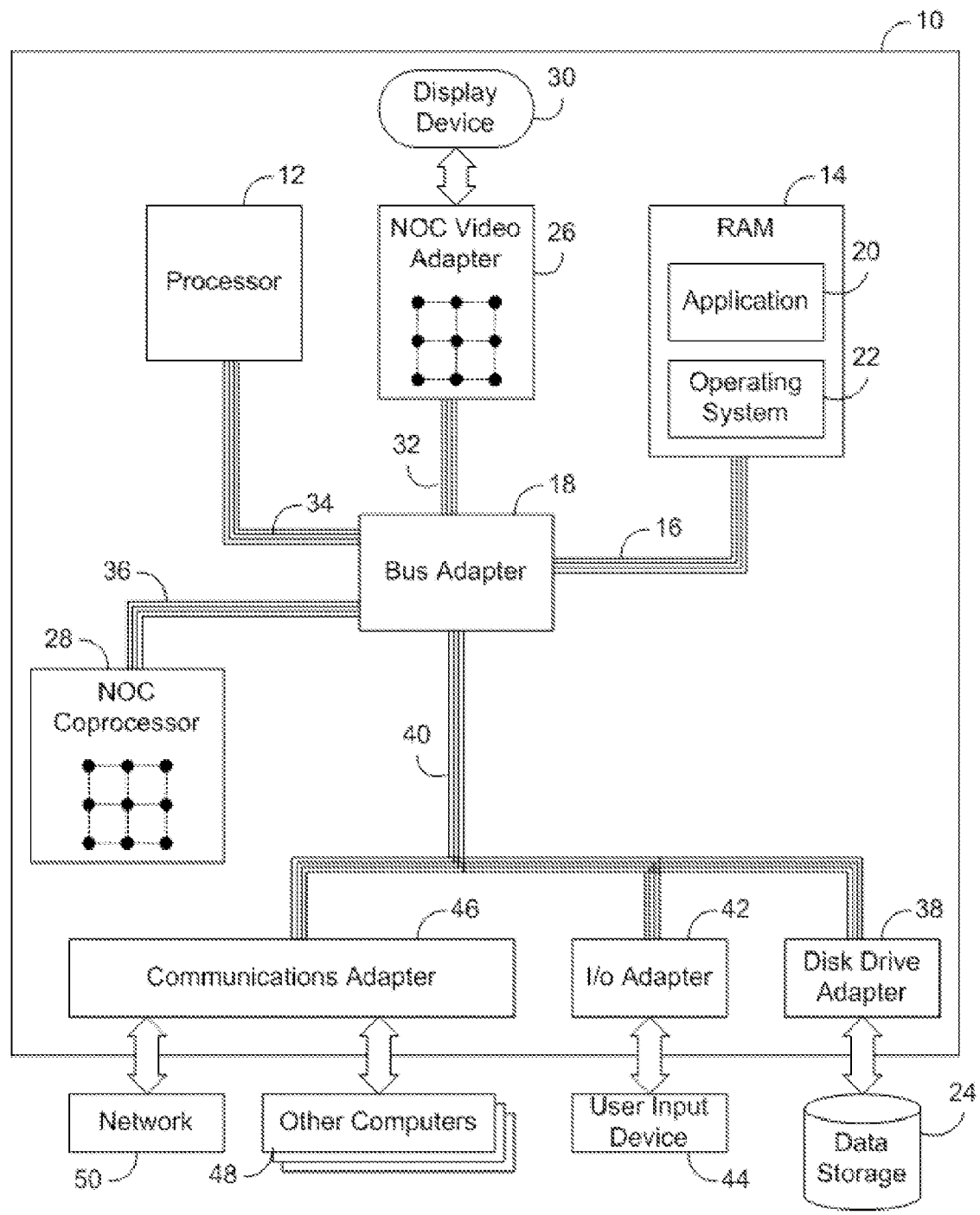
FIG. 1 is a block diagram of exemplary automated computing machinery including an exemplary computer useful in data processing consistent with embodiments of the present invention.

Embodiments consistent with the invention selectively perform regular expression matching in connection with accessing data with a processing unit based upon one or more regular expression matching-related attributes stored in a memory address translation data structure such as an Effective To Real Translation (ERAT) or Translation Lookaside Buffer (TLB). A memory address translation data structure may be accessed, for example, in connection with a memory access request for data in a memory page, such that attributes associated with the memory page in the data structure may be used to control whether regular expression matching is performed in association with the data access, and if so, how such matching is to be performed. An expression engine, integrated with the processing unit, may be used to perform the regular expression matching when so indicated by the regular expression matching-related attribute, while data accesses to other memory pages that are not so indicated in the memory address translation data structure may bypass the integrated expression engine.

Regular expression matching, in this regard, refers to a matching algorithm used to detect specific values in a set of data, e.g., detecting detect particular characters, words, or patterns of characters in a string of text. Regular expression matching is often used, for example, in edge of network workloads to detect specific values in data packets communicated over a network.

A regular expression matching-related attribute for use in connection with address translation-based regular expression matching may include, for example, an indicator of whether or not regular expression matching should be performed for data in a page or other region of memory, what status information should be collected (e.g., match/no match indicator, offset(s) to matching value(s), etc.), whether regular expression matching should be performed for loads and stores, for loads only, or for stores only, what regular expression(s) should be matched (e.g., an index to a table of expressions), configuration information (e.g., whether to perform case sensitive or whole word matching) or any other information useful in selectively performing regular expression matching.

An integrated expression engine consistent with the invention is typically coupled in the memory access path between a processing unit and a shared memory, and in many instances may be disposed within a processing unit itself. An integrated expression engine may also be disposed between different levels of cache memory, e.g., between an L2 and L1 cache such that regular expression matching is performed in association with moving data between different levels of cache. A processing unit may be implemented as a processing core among a plurality of processing cores on a multi-core chip, or may be the sole processing core on a chip in other embodiments. While an expression engine may be outside of the load/store path of a processing unit in some embodiments, it is generally desirable for the expression engine to be disposed relatively close to the processing unit such that expression matching may be efficiently performed in association with a memory access request and associated memory address translation data structure lookup that determines whether regular expression matching is to be performed in association with the memory access request.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
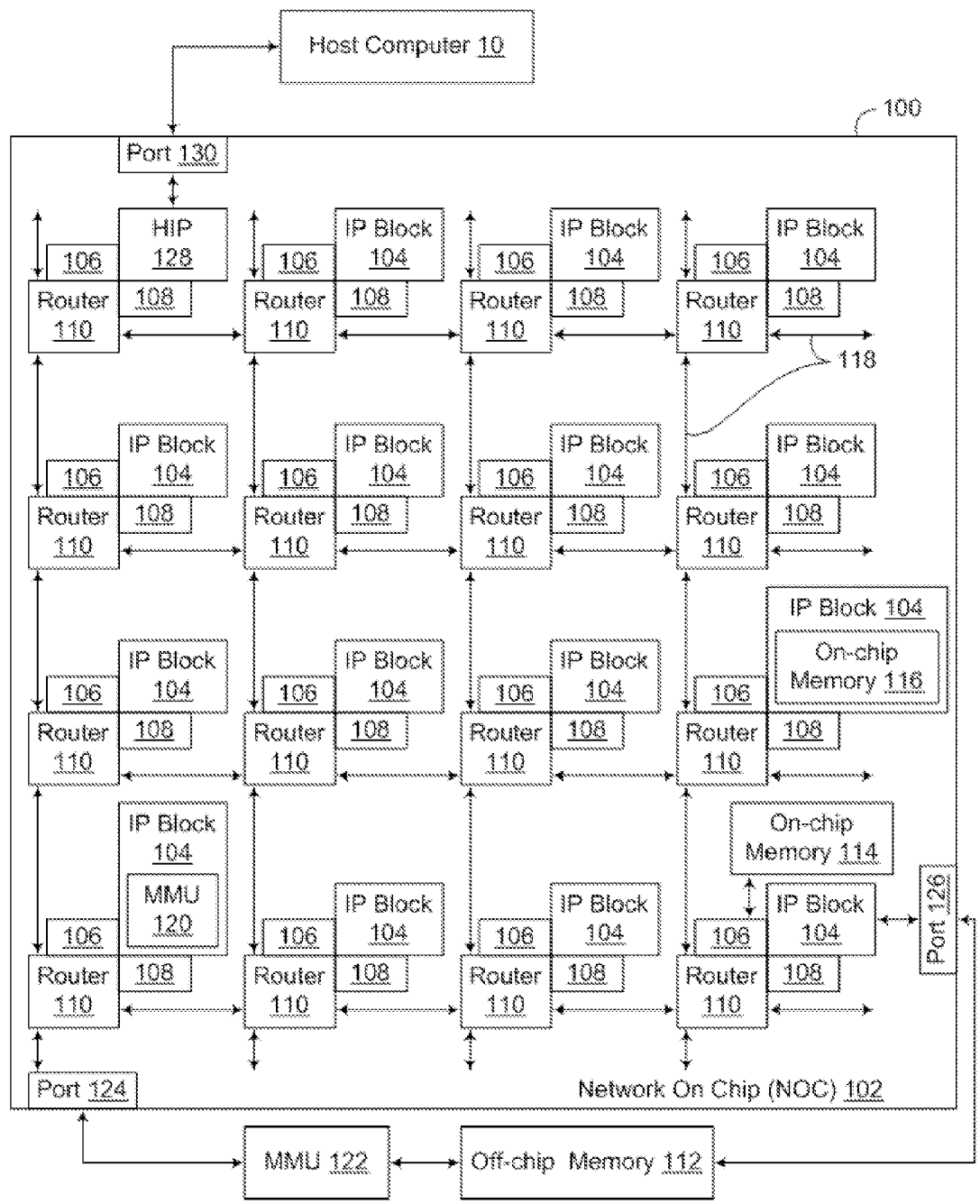
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
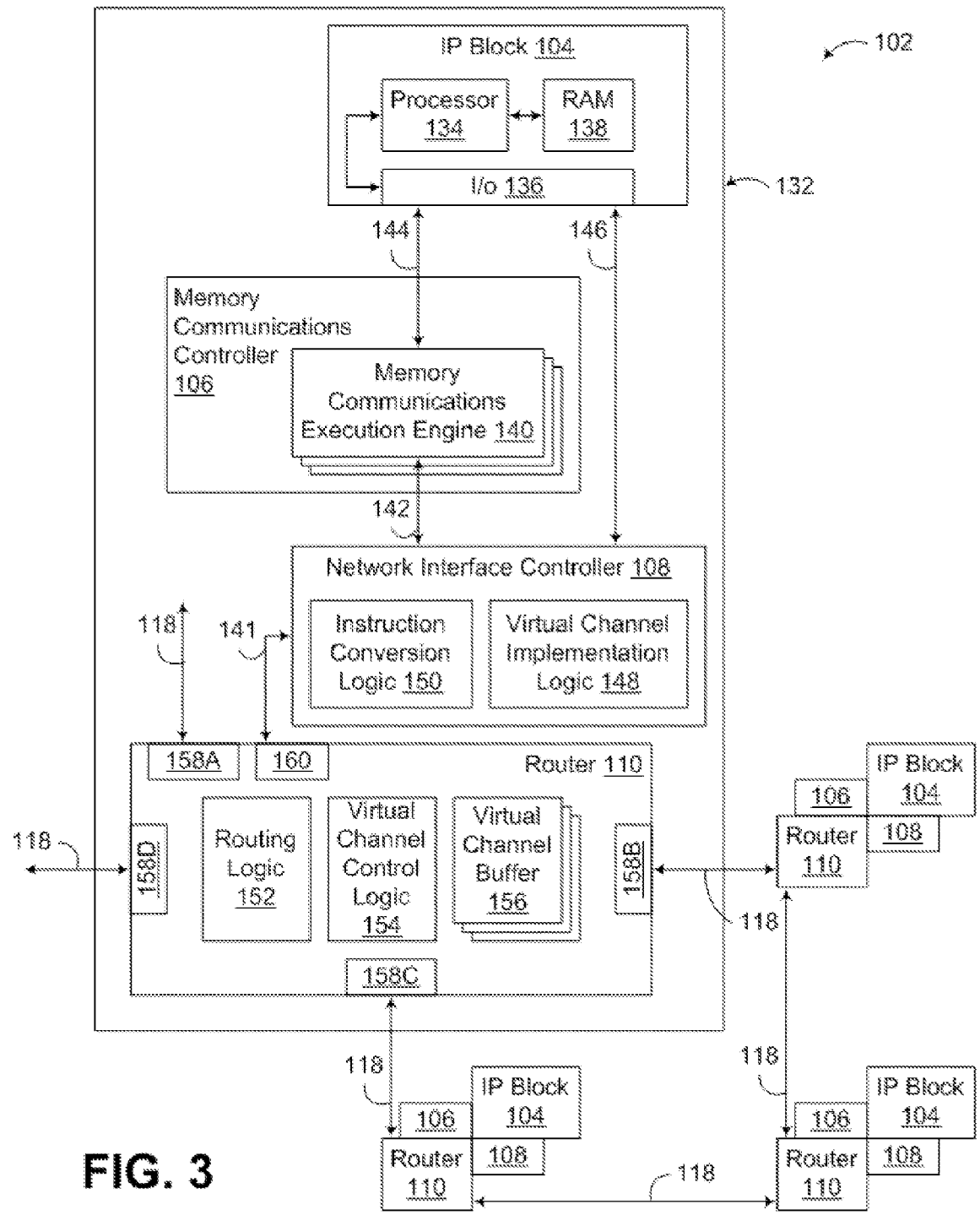
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
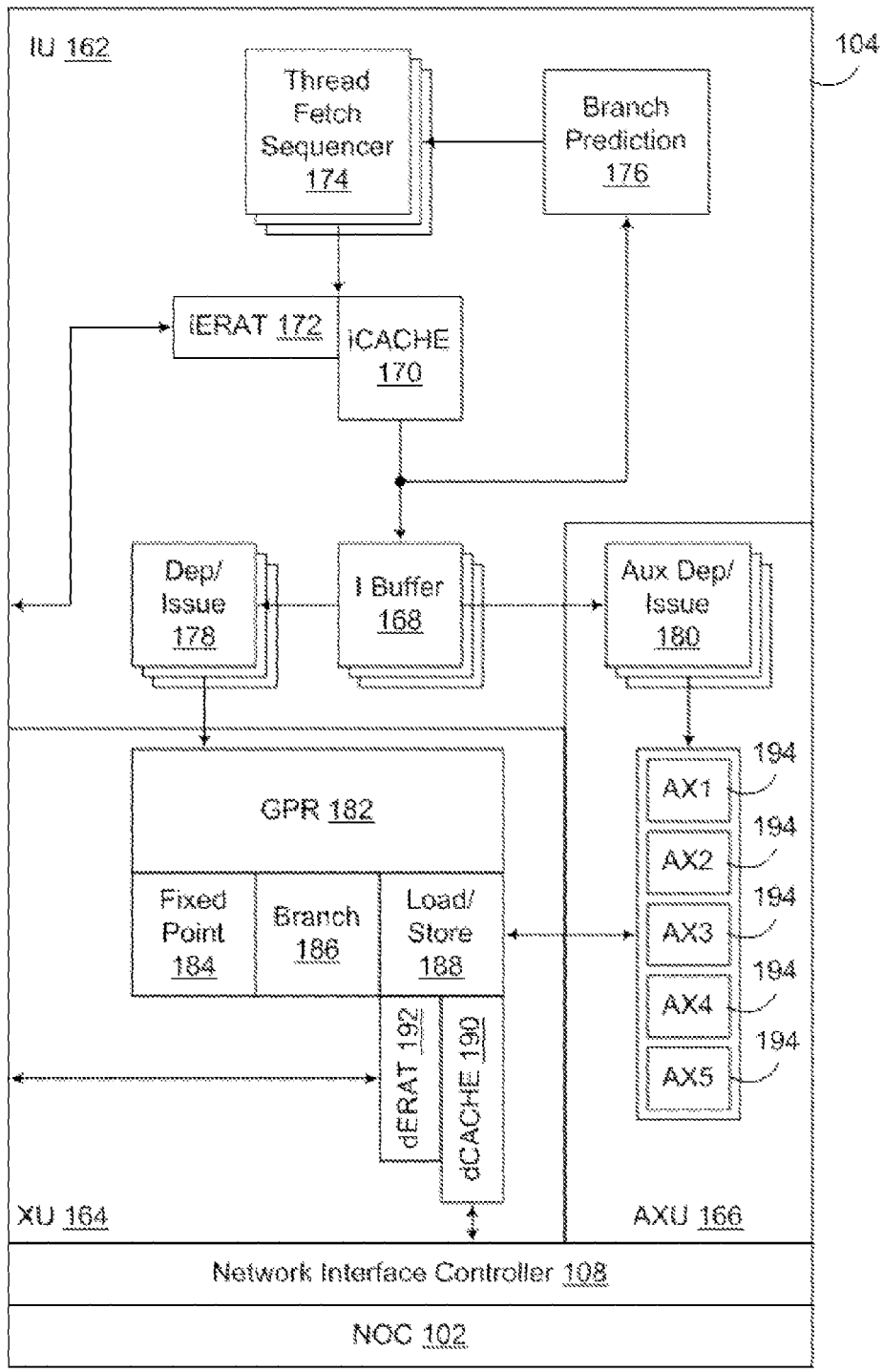
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Address Translation-Based Regular Expression Matching

Regular expression matching is used in a number of different applications. One such application is with edge of network workloads, such as workloads targeted by the IBM PowerEN family of System on Chips (SoCs). These SoCs have dedicated on-chip regular expression matching coprocessors, but the coprocessors are located relatively far away and disjoint from the general purpose processing cores on a chip. Therefore, the general purpose processing cores typically need to run data through the dedicated coprocessors before loading and using the data, which can be a relatively time consuming process. In addition, the dedicated coprocessors are a shared resource on the SoC and therefore may be a bottleneck in real-time software algorithms.

Some embodiments consistent with the invention, on the other hand, enable real-time software algorithms to remove the bottleneck of using shared dedicated regular expression matching coprocessors on SoCs by utilizing inline regular expression match capabilities integrated with general purpose processing core memory accesses. A regular expression matching-related attribute is incorporated into a memory address translation data structure that identifies each page of memory as being enabled for regular expression matching or not. If enabled for regular expression matching, a general purpose processing core, upon executing a load instruction, may also perform the requested regular expression matching operation, which allows a current Instruction Set Architecture (ISA) to be maintained (i.e., same load and store instructions), with just a memory attribute used to selectively perform regular expression matching.

In addition, in some embodiments, memory attribute aliasing may be used if one processing core wants to perform regular expression matching and another processing core does not on the same data. Also, in some embodiments, processing cores may perform block loads on large amounts of data, which is often more useful to regular expression matching workloads. If block loads are used, an expression engine may record status information in internal registers or memory buffers so that the requesting processing core may quickly access match results. Furthermore, processing cores may perform block stores on large amounts of data, which is often more useful to regular expression matching workloads. If block stores are used, a regular expression engine may optionally send status information piggybacked with the store data so that other processing cores, for example, may use the status information.

Figure 5:
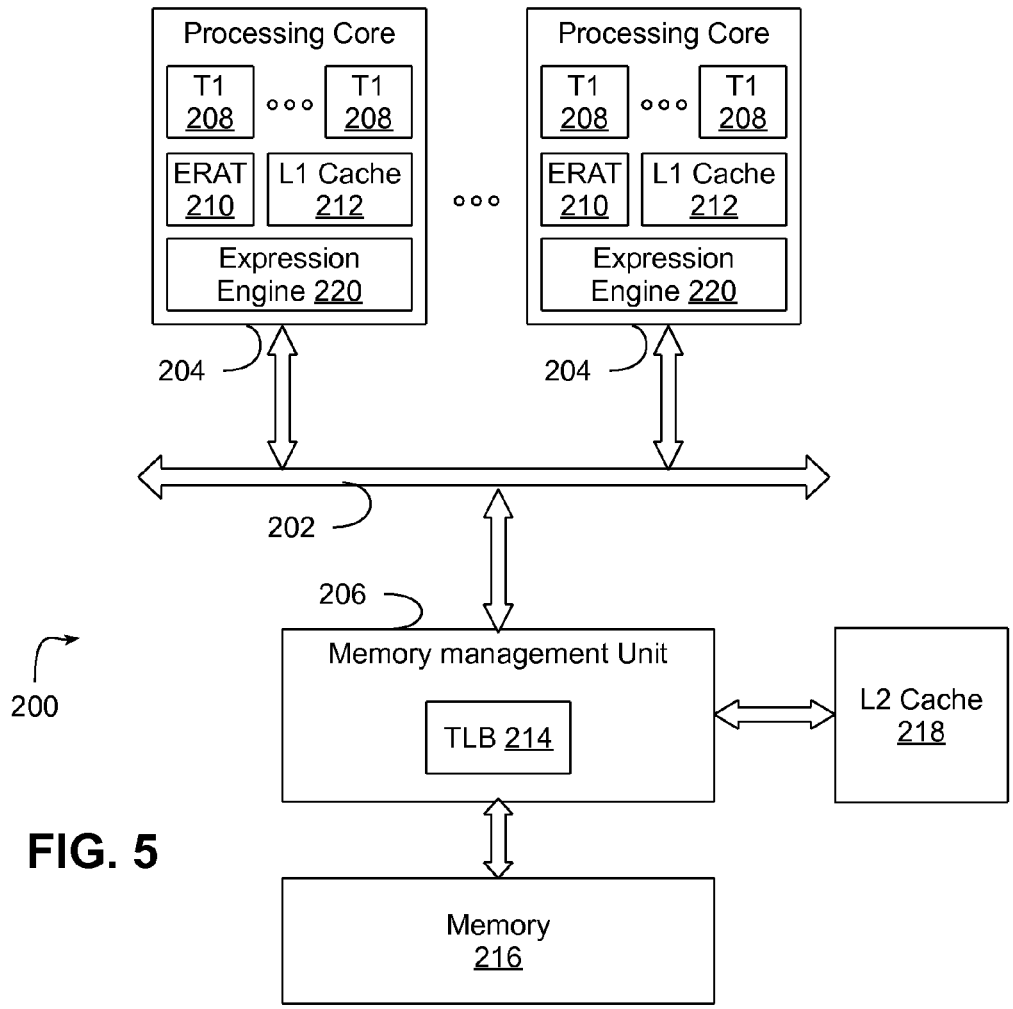
FIG. 5 is a block diagram of an exemplary data processing system incorporating memory address translation-based regular expression matching consistent with the invention.

FIG. 5, for example, illustrates an exemplary data processing system 200 suitable for implementing address translation-based regular expression matching consistent with the invention. System 200 is illustrated with a memory bus 202 coupling together a plurality of processing cores 204 to a memory management unit (MMU) 206. While only two processing cores 204 are illustrated in FIG. 5, it will be appreciated that any number of processing cores may be utilized in different embodiments of the invention.

Each processing core 204 is an SMT core including a plurality (N) of hardware threads 208, along with an Effective To Real Translation (ERAT) unit 210 and integrated L1 cache 212. ERAT 210, as is understood in the art, serves as a cache for memory address translation data, e.g., PTEs, and is typically associated with a lower level data structure, e.g., a translation lookaside buffer (TLB) 214 disposed in or otherwise accessible to MMU 206. TLB 214 may also serve as a cache for a larger page table, which is typically stored in a memory 216.

The memory system may include multiple levels of memory and caches, and as such, data processing system 200 is illustrated including an L2 cache 218 coupled to MMU 206 and shared by processing cores 204. It will be appreciated, however, that various alternative memory architectures may be utilized in other embodiments of the invention. For example, additional levels of cache memory, e.g., L3 caches, may be used, and memory 216 may be partitioned in some embodiments, e.g., in Non-Uniform Memory Access (NUMA)-based data processing systems. Furthermore, additional cache levels may be dedicated to particular processing cores, e.g., so that each processing core includes a dedicated L2 cache, which may be integrated into the processing core or coupled between the processing core and the memory bus. In some embodiments, an L2 or L3 cache may be coupled directly to the memory bus, rather than via a dedicated interface to an MMU.

In addition, it will be appreciated that the components illustrated in FIG. 5 may be integrated onto the same integrated circuit device, or chip, or may be disposed in multiple such chips. In one embodiment, for example, each processing core is implemented as an IP block in a NOC arrangement, and bus 202, MMU 206 and L2 cache 218 are integrated onto the same chip as the processing cores in an SoC arrangement. In other embodiments, bus 202, MMU 206, L2 cache 218, and/or memory 216 each may be integrated on the same chip or in different chips from the processing cores, and in some instances processing cores may be disposed on separate chips.

Given the wide variety of known processor and memory architectures with which the invention may be utilized, it will therefore be appreciated that the invention is not limited to the particular memory architecture illustrated herein.

To implement address translation-based regular expression matching consistent with the invention, one or more processing cores 204 in data processing system 200 includes an expression engine 220, e.g., disposed within a memory access path between processing core 204 and a lower level of memory such as L2 cache 218 and/or memory 216, such that expression engine 220 may be used to perform regular expression matching in connection with general purpose loads and/or stores requested by processing core 204.

Figure 6:
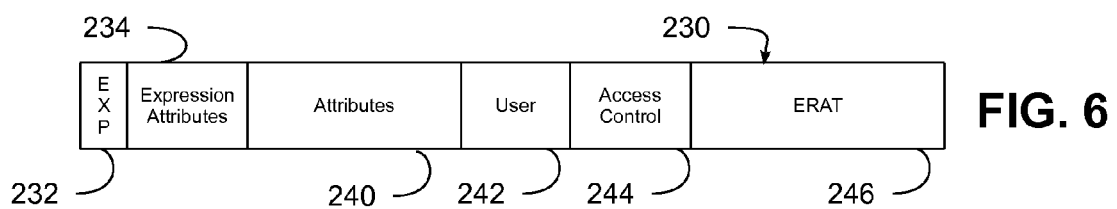
FIG. 6 is a block diagram of an exemplary ERAT entry format for the ERAT referenced in FIG. 5.

As noted above, address translation-based regular expression matching may be implemented by adding one or more page or memory attributes to a memory address translation data structure, e.g., a page table entry (PTE). FIG. 6, for example, illustrates an exemplary PTE 230 capable of being maintained in an ERAT 210 or TLB 214, and extended to include various page attributes 232-234 to support address translation-based regular expression matching. A expression matching attribute 232, e.g., a one-bit flag, may be used to indicate whether regular expression matching should be performed for the data in the page.

In addition, while in some embodiments only a single bit memory attribute is required to implement address translation-based regular expression matching, in other embodiments, it may be desirable to provide additional expression attributes 234, e.g., what status information should be collected (e.g., match/no match indicator, offset(s) to matching value(s), etc.), whether regular expression matching should be performed for loads and stores, for loads only, or for stores only, what regular expression(s) should be matched (e.g., an index to a table of expressions), configuration information or match constraints (e.g., whether to perform case sensitive or whole word matching) or any other information useful in selectively performing regular expression matching PTE 230 also stores additional data, similar to conventional PTEs. For example, additional page attributes 240 such as attributes indicating whether a page is cacheable, guarded, or read-only, whether memory coherence or write-through is required, an endian mode bit, etc., may be included in a PTE, as may one or more bits allocated to user mode data 242, e.g., for software coherency or control over cache locking options. An access control page attribute 244 may be provided to control what processes are permitted to access a page of memory, e.g., by specifying a process identifier (PID) associated with the process that is authorized to access the page, or optionally a combination of match and/or mask data, or other data suitable for specifying a set of processes that are authorized to access a page of memory. For example, the access control attribute may mask off one or more LSBs from a PID so that any PID matching the MSBs in the access control attribute will be permitted to access the corresponding memory page. ERAT page attribute 246 stores the effective to real translation data for the PTE, typically including the real address corresponding the effective/virtual address that is used to access the PTE, as well as the effective/virtual address, which is also used to index the ERAT via a CAM function.

It will be appreciated that the format of PTE 230 may also be used in TLB 214 and any other page table resident in the memory architecture. Alternatively, the PTEs stored in different levels of the memory architecture may include other data or omit some data based upon the needs of that particular level of the memory architecture. Furthermore, it will be appreciated that, while the embodiments discussed herein utilize the terms ERAT and TLB to describe various hardware logic that stores or caches memory address translation information in a processor or processing core, such hardware logic may be referred to by other nomenclature, so the invention is not limited to use with ERATs and TLBs. In addition, other PTE formats may be used and therefore the invention is not limited to the particular PTE format illustrated in FIG. 6.

By storing regular expression matching-related attributes in a PTE, the determination of whether data regular expression matching is to be performed in connection with accessing data in a page may readily be determined in association with accessing that data. As is well known in the art, a hypervisor or other supervisor-level software, e.g., running in firmware, a kernel, a partition manager or an operating system, is conventionally used to allocate memory pages to particular processes and to handle access violations that might otherwise occur if a process attempts to access a memory page for which it is not authorized to access. Such supervisor-level software, for example, may manage an overall page table for the data processing system, with dedicated hardware in the data processing system used to cache PTEs from a page table in TLB 214 and ERATs 210. Embodiments consistent with the invention are therefore able to leverage existing supervisor-level access controls to set up on behalf of various applications or processes, what pages or regions of memory allocated to those applications or processes will be used to store data upon which regular expression matching is to be performed, and if so, how such matching is to be performed.

Figure 7:
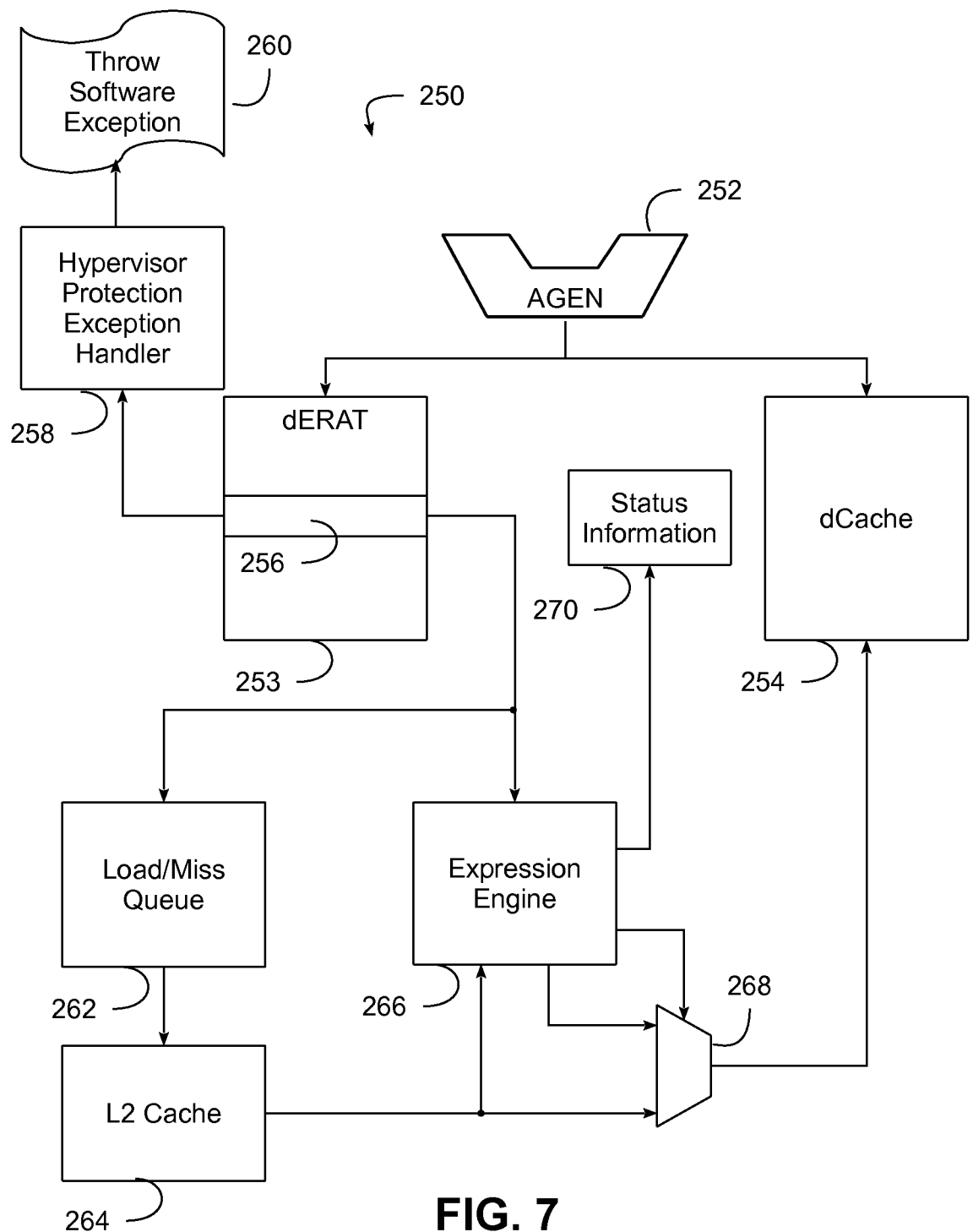
FIG. 7 is a block diagram illustrating an exemplary memory access using a data processing system supporting memory address translation-based regular expression matching consistent with the invention.

FIG. 7 for example, illustrates an exemplary data processing system 250, and in particular, an exemplary processing core therein, for the purposes of illustrating an exemplary memory access that utilizes address translation-based regular expression matching consistent with the invention. Address generation logic 252, e.g., as provided in a load/store unit of a processing core, may generate a memory access request to access data (e.g., a cache line) from a particular page of memory, e.g., in response to an instruction executed by a hardware thread (not shown) executing in the processing core. The memory access request is issued to both an ERAT 253 and an L1 cache 254 in parallel, with the former performing an address translation operation, along with determining whether the memory access request is authorized for the PID with which the requesting hardware thread is associated, and with the latter determining whether the cache line specified by the memory access request is currently cached in the L1 cache. In the illustrated embodiment of FIG. 7, ERAT 253 is designated a "dERAT" and L1 cache 254 is designated a "dCache" to indicate that these components are associated with data accesses, and that corresponding iERAT and iCache components may be provided to handle instruction accesses (not shown).

ERAT 253, in response to the memory access request, accesses a PTE 256 for the page of memory specified by the memory access request. Hypervisor protection exception handler logic 258 compares a PID for the memory access request with the access control bits in the PTE, and if an access violation occurs as a result of the PID not being authorized to access this page of memory, logic 258 signals an interrupt by throwing a software exception to the supervisor-level software, as represented at 260. In the event that a memory access request is authorized but a miss occurs on the L1 cache, the memory access request is forwarded to a load/miss queue 262, which issues the request to a lower level of memory, e.g., an L2 cache 264.

Furthermore, as illustrated in FIG. 7, an inline expression engine 266, which is coupled in the access path between L2 cache 264 and L1 cache 254, and integrated within the processing core, also utilizes the data in PTE 256 to determine whether to perform regular expression matching for the data being returned for the memory access request. In the event that regular expression matching is to be performed, expression engine 266 controls multiplexing logic 268 to effectively stream the data through expression engine 266 prior to storing the data in L1 cache 254. If not, expression engine 266 controls multiplexing logic 268 to feed the data from L2 cache 264 to L1 cache 254. Expression engine 266 may also retrieve other expression-related attributes from PTE 256 to control how the regular expression matching is performed. It will be appreciated that multiplexing logic 268 may be omitted in some embodiments such that the data is provided to expression engine 266 in parallel with L1 cache 254. However, by providing the ability to stream the data through the expression engine prior to storing it in the L1 cache, the expression engine may be able to modify the data prior to being stored in the L1 cache, e.g., in connection with a query/replace or similar algorithm.

Expression engine 266 also outputs status information 270 reflecting the results of regular expression matching. The status information may be stored, for example, in a register file, in one or more special purpose registers, in a dedicated buffer, in L1 cache 254, or in another storage device accessible by the processing core. Various types of status information may be stored, e.g., whether a match was found, the location of one or more matches in the data, the number of matches, etc.

Figure 8:
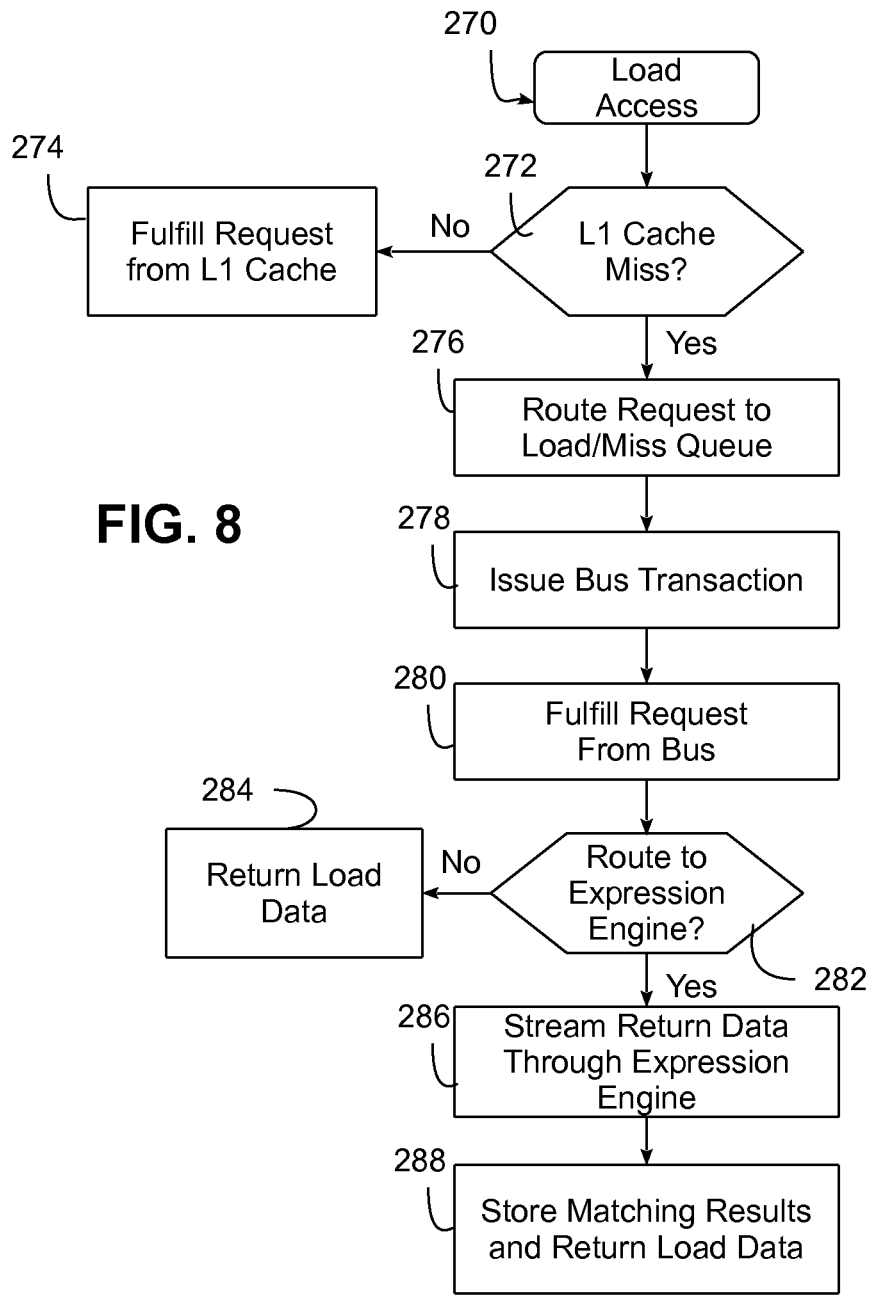
FIG. 8 is a flowchart illustrating an exemplary sequence of operations for performing a load access in the data processing system of FIG. 7.

FIG. 8 illustrates in greater detail a sequence of operations 270 that may be performed in response to a memory access request issued by a hardware thread on behalf of a process in data processing system 250 to load data from a cache line. In order to simplify this discussion, it is assumed that protection logic has already determined that the requesting thread has the right to access the page associated with the memory access request, so access control-related steps are not illustrated in FIG. 8. Thus, if a thread is accessed to load data from a particular cache line, a determination is made as to whether the request can be fulfilled by L1 cache 254 (block 272). If the memory access request does not miss on L1 cache 254, the request is fulfilled by L1 cache 254 (block 274), and handling of the memory access request is complete.

However, if the request misses on L1 cache 254, the request is routed to load/miss queue 262 in block 276 to add an entry in the queue corresponding to the request. Next, a bus transaction is issued for the memory access request in block 278, and some time thereafter, in block 280, the request in fulfilled by the bus. Next, in block 282, the PTE corresponding to the access request is accessed to determine whether regular expression matching is enabled for the page of memory associated with the request. If not, control passes to block 284 to return the requested cache line, either directly from the L2 cache, or, if not presently cached in the L2 cache, from the main memory.

Otherwise, if regular expression matching is to be performed on this cache line, block 282 passes control to block 286 to stream the data through the expression engine prior to returning the data to the L1 cache, and outputting the status information reflecting the results of the regular expression matching operation, in block 288. The manner in which regular expression matching is performed may either be hard-coded, or may be customized based on attributes in the PTE and/or other configuration settings established by the processing core. For example, the processing core may store one or more regular expressions in expression engine 266 as well as set various match parameters (e.g., case sensitive, whole word, etc.) in special purpose registers associated with the expression engine.

Figure 9:
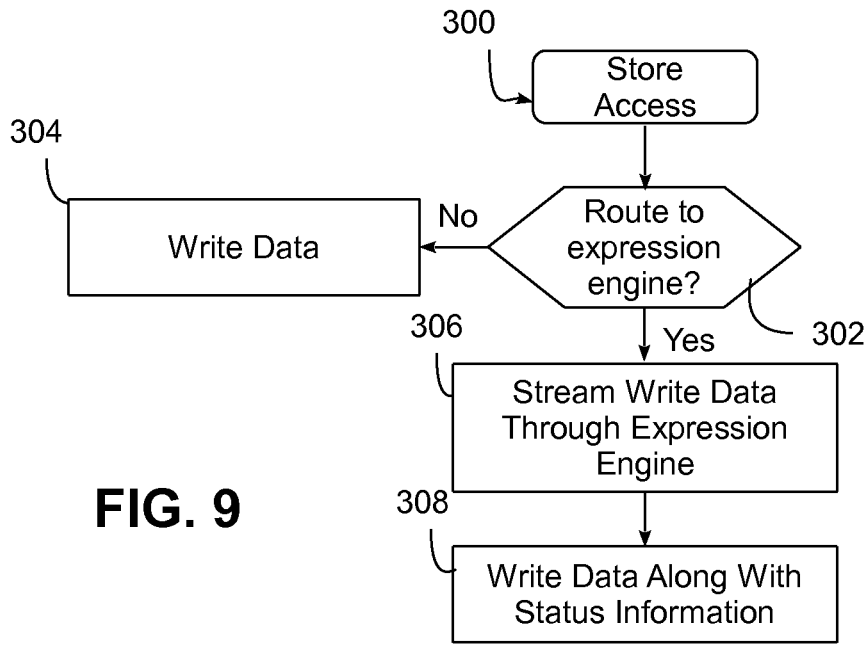
FIG. 9 is a flowchart illustrating an exemplary sequence of operations for performing a store access in the data processing system of FIG. 7.

FIG. 9 next illustrates a complementary store access routine 300 executed by a processing core when performing a store of data. Routine 300 may be performed, for example, when casting out a cache line in L1 cache 254, or alternatively, when writing data directly to a lower level of memory. Routine 300 begins in block 302 by determining whether the data needs to be routed through the expression engine based on the regular expression matching-related attributes in the PTE. If not, control passes to block 304 to output the data in a conventional manner. Otherwise, control passes to block 306 to stream the write data through the expression engine, and then outputting the write data along with status information in block 308. As noted above, in some embodiments it may be desirable to "piggyback" status information along with write data output to a shared bus such that another processing core that is accessing the write data may also access the status information generated as a result of performing regular expression matching on the data. Such a configuration may be useful, for example, when utilizing multiple cores to perform multiple regular expression matching operations on the same data.

Figure 10:
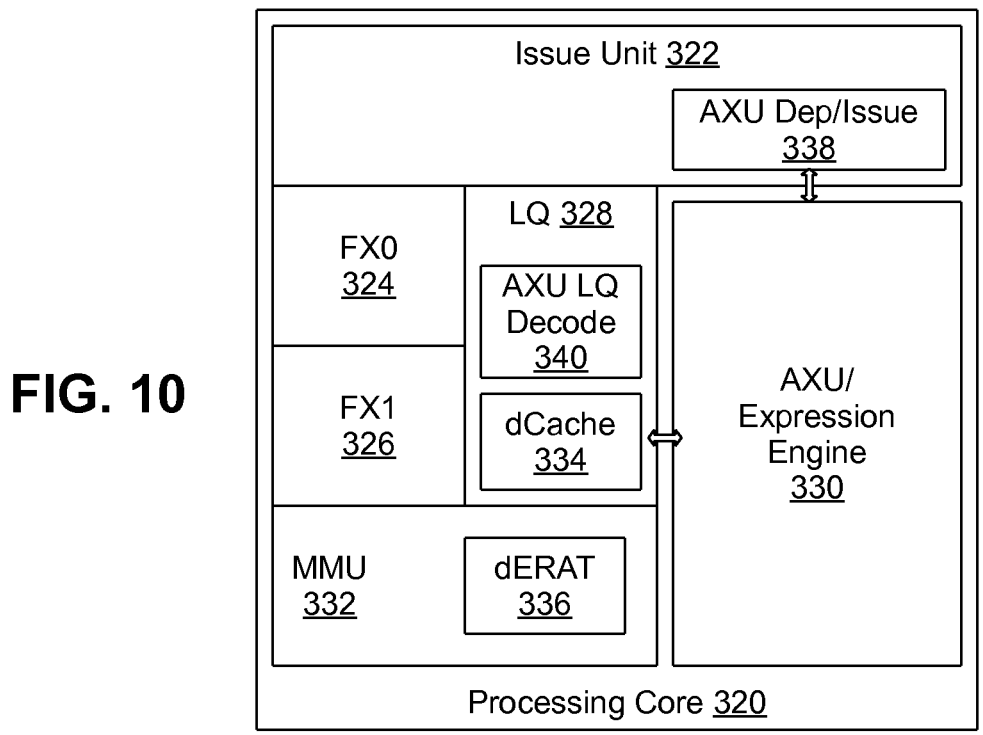
FIG. 10 is a block diagram illustrating an exemplary data processing system including an expression engine implemented in an auxiliary execution unit of a processing core, and suitable for implementing address translation-based regular expression matching consisting with the invention.

It will be appreciated that the aforementioned routines may be used in environments where block loads and stores are supported, i.e., where individual memory access requests may be used to request multiple cache lines of data. For example, as illustrated in FIG. 10, it may be desirable in a processing core 320 to support block load/store functionality coordinated by an auxiliary execution unit to perform regular expression matching on larger blocks of data than individual cache lines.

Processing core 320 may be configured, for example, similar to an IP block 104 from FIG. 4, and may include an issue unit 322, first and second fixed point execution units 324, 326, load store (LQ) unit 328, and auxiliary execution unit (AXU) 330. An MMU 332 may be used to manage the transfer of data between a shared bus an L1 cache (dCache) 334 using an ERAT 336 to store PTEs, including regular expression matching-related attributes.

AXU 330 may be configured as an expression engine with block load/store functionality, and may include dedicated dependency/issue logic 338 in issue unit 322 and dedicated load/store decode logic 340 in load store unit 328. Block load/store instructions may be supported to perform multicache line memory access requests, with selective streaming through AXU 330 to perform regular expression matching on desired blocks of data.

It will be appreciated that regular expression matching may be performed at other levels of a memory architecture, e.g., between the processing core register file and an L1 cache, between an L2 and L3 cache, between a cache and main memory, etc.

Therefore, embodiments consistent with the invention may be used to facilitate the performance of regular expression matching on data to reduce the overhead associated with regular expression matching, often without a need for dedicated instructions, and often with reduced contention for expression matching resources. Various additional modifications may be made to the disclosed embodiments without departing from the spirit and scope of the invention. Therefore, the invention lies in the claims hereinafter appended.

What is claimed is:

1. A method of accessing data in a data processing system, the method comprising:
    generating a memory access request initiated by a processing unit in a data processing system;
    issuing the memory access request to both a memory address translation data structure and a memory cache in parallel with the memory address translation data structure;
    in response to the memory access request initiated by the processing unit in the data processing system, accessing the memory address translation data structure to perform a memory address translation for the memory access request;
    accessing at least one regular expression matching-related attribute in the memory address translation data structure to determine whether regular expression matching should be performed on data from the memory page associated with the memory access request;
    determining whether a cache line specified by the memory access request is currently cached in the memory cache;
    causing regular expression matching to be performed on data from the memory page based upon the at least one regular expression matching-related attribute; and
    a memory attribute aliasing occurs when the processing core performs regular expression matching on the data and another processing core does not, wherein
        the causing regular expression matching to be performed includes streaming the data through an expression engine coupled to the processing unit,
        the processing unit is disposed in a processing core,
        the expression engine is integrated in the processing core,
        the expression engine is an inline expression engine, and
        the data bypasses the expression engine in response to determining that regular expression matching should not be performed in association with the memory access request.

2. The method of claim 1, wherein the memory address translation data structure includes a plurality of page table entries, each page table entry including a real address associated with the memory page associated with the page table entry and the regular expression matching-related attribute associated with such memory page.

3. The method of claim 1, wherein the at least one regular expression matching-related attribute includes at least one attribute configured to control how the expression engine performs regular expression matching.

4. The method of claim 3, wherein the at least one regular expression matching-related attribute controls what status information is collected by the expression engine.

5. The method of claim 4, wherein the status information includes a match/no match indicator.

6. The method of claim 4, wherein the status information includes at least one offset to a matching value in the data.

7. The method of claim 3, wherein the at least one regular expression matching-related attribute controls whether regular expression matching is to be performed for loads, for stores or for both.

8. The method of claim 3, wherein the at least one regular expression matching-related attribute controls at least one match constraint selected from the group consisting of case sensitive and whole word.

9. The method of claim 3, wherein the at least one regular expression matching-related attribute selects at least one regular expression upon which to perform regular expression matching.

10. The method of claim 1, wherein the memory access request is a store request, the method further comprising:
    generating status information as a result of regular expression matching on the data; and
    piggybacking the status information with the data in association with outputting the data from the processing unit.

11. A circuit arrangement, comprising:
    a processing unit;
    a memory address translation data structure for use in performing a memory address translation for a memory access request initiated by the processing unit, the memory address translation data structure including at least one regular expression matching-related attribute that indicates whether regular expression matching should be performed on data from the memory page associated with the memory access request;
    control logic configured to cause regular expression matching to be performed on data from the memory page based upon the at least one regular expression matching-related attribute in the memory address translation data structure; and
    an expression engine coupled to the control logic and disposed between different levels of cache memory so that regular expression matching is performed in association with moving data between different levels of cache; and
    a memory attribute aliasing occurs when the processing core performs regular expression matching on the data and another processing core does not, wherein
        the regular expression matching to be performed includes streaming the data through an expression engine coupled to the processing unit,
        the processing unit is disposed in a processing core, and wherein the expression engine is integrated in the processing core,
        the expression engine is an inline expression engine,
        the data bypasses the expression engine in response to determining that regular expression matching should not be performed in association with the memory access request, and
        the memory address translation data structure includes a plurality of page table entries, each page table entry including a real address associated with the memory page associated with the page table entry and the regular expression matching-related attribute associated with such memory page.

12. The circuit arrangement of claim 11, wherein the control logic is configured to cause the regular expression matching to be performed for the streaming the data through the expression engine.

13. The circuit arrangement of claim 11, wherein the at least one regular expression matching-related attribute includes at least one attribute configured to control how the expression engine performs regular expression matching.

14. The circuit arrangement of claim 13, wherein the at least one regular expression matching-related attribute controls what status information is collected by the expression engine.

15. The circuit arrangement of claim 13, wherein the at least one regular expression matching-related attribute controls whether regular expression matching is to be performed for loads, for stores or for both.

16. The circuit arrangement of claim 13, wherein the at least one regular expression matching-related attribute controls at least one match constraint selected from the group consisting of case sensitive and whole word.

17. The circuit arrangement of claim 11, wherein the memory access request is a store request, and wherein the control logic is configured to cause status information generated as a result of regular expression matching on the data to be piggybacked with the data in association with outputting the data from the processing unit.

18. An integrated circuit device comprising the circuit arrangement of claim 11.

19. A program product comprising a non-transitory computer readable medium and logic definition program code stored on the computer readable medium and defining the circuit arrangement of claim 11.

* * * * *